(12) United States Patent
Zhang et al.

(10) Patent No.: US 11,403,620 B2
(45) Date of Patent: Aug. 2, 2022

(54) PAYMENT SWITCHING METHOD AND DEVICE

(71) Applicant: Beijing Xiaomi Mobile Software Co., Ltd., Beijing (CN)

(72) Inventors: Xu Zhang, Beijing (CN); Yu Cheng, Beijing (CN); Jing Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 377 days.

(21) Appl. No.: 15/628,977

(22) Filed: Jun. 21, 2017

(65) Prior Publication Data
US 2017/0372299 A1 Dec. 28, 2017

Related U.S. Application Data

(63) Continuation of application No. PCT/CN2016/086692, filed on Jun. 22, 2016.

(51) Int. Cl.
*G06Q 20/34* (2012.01)
*G06Q 20/32* (2012.01)

(52) U.S. Cl.
CPC ........ *G06Q 20/351* (2013.01); *G06Q 20/322* (2013.01); *G06Q 20/325* (2013.01); *G06Q 20/327* (2013.01); *G06Q 20/3278* (2013.01); *G06Q 20/3552* (2013.01); *G06Q 20/3572* (2013.01)

(58) Field of Classification Search
USPC ......................................................... 705/41
See application file for complete search history.

(56) References Cited

U.S. PATENT DOCUMENTS 8,459,560 B1* 6/2013 Mineo-Goggin ........ G02B 5/32
235/487
2009/0037326 A1 2/2009 Chitti et al.
(Continued)

FOREIGN PATENT DOCUMENTS

| CN | 103400263 A | 11/2013 |
| CN | 104572175 A | 4/2015 |
| CN | 105678532 A | 6/2016 |

OTHER PUBLICATIONS

Hachman, M. (2011). Google wallet: Hands on. PC Magazine Online, , NA. Retrieved from https://dialog.proquest.com/professional/docview/1094473900?accountid=131444 on Apr. 5, 2022 (Year: 2011).*

(Continued)

*Primary Examiner* — Kito R Robinson
(74) *Attorney, Agent, or Firm* — Finnegan, Henderson, Farabow, Garrett & Dunner, L.L.P.

(57) ABSTRACT

A payment switching method includes displaying a display interface of virtual cards after receiving an interface displaying instruction by a first terminal. The display interface of the virtual cards displays at least two payment modes, one of the at least two payment modes being a currently selected payment mode. The method also includes determining a target payment mode from the at least two payment modes according to a detected payment switching operation and switching from the currently selected payment mode to the target payment mode. The method further includes performing a payment based on the target payment mode.

8 Claims, 5 Drawing Sheets

(56) References Cited

U.S. PATENT DOCUMENTS

| 2013/0060687 | A1* | 3/2013 | Bak | G06Q 20/4012 |
| | | | | 705/41 |
| 2014/0058941 | A1* | 2/2014 | Moon | G06Q 20/202 |
| | | | | 705/42 |
| 2014/0214665 | A1 | 7/2014 | Lee et al. | |
| 2015/0371226 | A1* | 12/2015 | Hurley et al. | |
| 2016/0358167 | A1* | 12/2016 | Van Os | G06Q 20/40145 |

OTHER PUBLICATIONS

Regions debit, credit and now cards are available for use with android pay. (Sep. 11, 2015). Business Wire Retrieved from https://dialog.proquest.com/professional/docview/1710942970?accountid=131444 on Apr. 5, 2022 (Year: 2015).*

Michael Roland, "android—Is it possible to launch an app when an NFC tag is scanned?—Stack Overflow", p. 1, XP055408789, published on Oct. 12, 2015, retrieved from http://stackoverflow.com/questions/33660923/is-it-possible-to-launch-an-app-when-an-nfc-tag-is-scanned/33074412#33074412.

Extended European Search Report dated Oct. 4, 2017 for EP application 17176703.1.

Michael Roland, "android—Is it possible to launch an app when an NFC tag is scanned?—Stack Overflow", Oct. 12, 2015, http://stackoverflow.com/questions/33060923/is-it-possible-to-launch-an-app-when-an-nfc-tag-is-scanned/33074412#33074412.

International Search Report dated Mar. 24, 2017, in counterpart International Application No. PCT/CN2016/086692.

European Office Action dated Feb. 21, 2019, in counterpart European Patent Application No. 17 176 703.1-1222.

* cited by examiner

PAYMENT SWITCHING METHOD AND DEVICE

CROSS REFERENCE TO RELATED APPLICATION

This application is a continuation of International Patent Application Serial No. PCT/CN2016/086692, filed on Jun. 22, 2016, the entire contents of which are incorporated herein by reference.

TECHNICAL FIELD

The present disclosure generally relates to the field of terminal technology and, more particularly, to a payment switching method and a payment switching device.

BACKGROUND

With the development of terminal technology, mobile payment technology has become more and more acceptable. At present, mobile payment technology is divided into two types based on the payment business level. A first type is a third-party payment, of which a clearing institution is primarily a third-party payment company. The third-party payment company serves as an intermediary to perform a payment with banks. A second type is a flash payment based on Near Field Communication (NFC), of which the clearing institution can be a Unionpay organization. The Unionpay organization serves as an intermediary to perform a payment with banks. In either type of payment, the payment process is significantly simplified. Such electronic payments replace physical bank cards and cash, thereby ensuring security of funds transfer.

SUMMARY

According to a first aspect of the present disclosure, a payment switching method is provided. The payment switching method includes displaying a display interface of virtual cards after receiving an interface displaying instruction by a first terminal. The display interface of the virtual cards displays at least two payment modes, one of the at least two payment modes being a currently selected payment mode. The payment switching method also includes determining a target payment mode from the at least two payment modes according to a detected payment switching operation and switching from the currently selected payment mode to the target payment mode. The payment switching method further includes performing a payment based on the target payment mode.

According to a second aspect of the present disclosure, a device for switching a payment mode is provided. The device includes a processor and a memory configured to store instructions executable by the processor. The processor is configured to display a display interface of virtual cards after receiving an interface displaying instruction. The display interface of the virtual cards displays at least two payment modes, one of the at least two payment modes being a currently selected payment mode. The processor is also configured to determine a target payment mode from the at least two payment modes according to a detected payment switching operation and switch from the currently selected payment mode to the target payment mode. The processor is further configured to perform a payment based on the target payment mode.

According to a third aspect of the present disclosure, a non-transitory computer-readable storage medium is provided. The non-transitory computer-readable storage medium has instructions stored therein that, when executed by a processor of a device, cause the device to perform a payment switching method. The method includes displaying a display interface of virtual cards after receiving an interface displaying instruction by a first terminal. The display interface of the virtual cards displays at least two payment modes, one of the at least two payment modes being a currently selected payment mode. The method also includes determining a target payment mode from the at least two payment modes according to a detected payment switching operation and switching from the currently selected payment mode to the target payment mode. The method further includes performing a payment based on the target payment mode.

It is to be understood that, both the foregoing general description and the following detailed description are exemplary and explanatory only and are not restrictive of the present disclosure.

BRIEF DESCRIPTION OF THE DRAWINGS

The accompanying drawings, which are incorporated in and constitute part of the specification, illustrate embodiments consistent with the present disclosure and, together with the description, serve to explain the principles of the present disclosure.

DETAILED DESCRIPTION

In order to explain the purposes, technical solutions, and advantages of the present disclosure, embodiments of the present disclosure will now be described in detail by referring to the accompanying drawings. The illustrative embodiments of the present disclosure and descriptions thereof are intended to explain the present disclosure, and are not intended to limit the present disclosure.

Payment modes disclosed in the present disclosure include a first payment mode and a second payment mode. In some embodiments, the first payment mode is a flash payment based on NFC. The second payment mode is a third-party payment mode. Both of the payment modes may be provided by a payment application.

With the flash payment based on NFC, an interaction between an NFC module on a paying terminal and an NFC module on a receiving terminal is performed. As a result, an exchange of payment information is performed between the terminals. This enables an exchange of data to be performed between the receiving terminal and a backstage supporter (for example, a Unionpay server or a bank server), thereby realizing the payment from the paying terminal to the receiving terminal.

With the third-party payment mode, a payment account is provided by a third-party, licensed payment institution. A user can bind bank cards within the payment account or recharge the payment account. An interaction between a receiving account and a paying account is performed between the receiving terminal and the paying terminal by, for example, scanning a two-dimensional (2D) barcode during a payment process, thereby realizing the payment from the paying account to the receiving account.

The term "third-party" is used herein to distinguish it from the bank or the user, and has no other special meaning. In some embodiments, a provider of the third-party payment mode can be a manufacturer of terminals.

Figure 1:
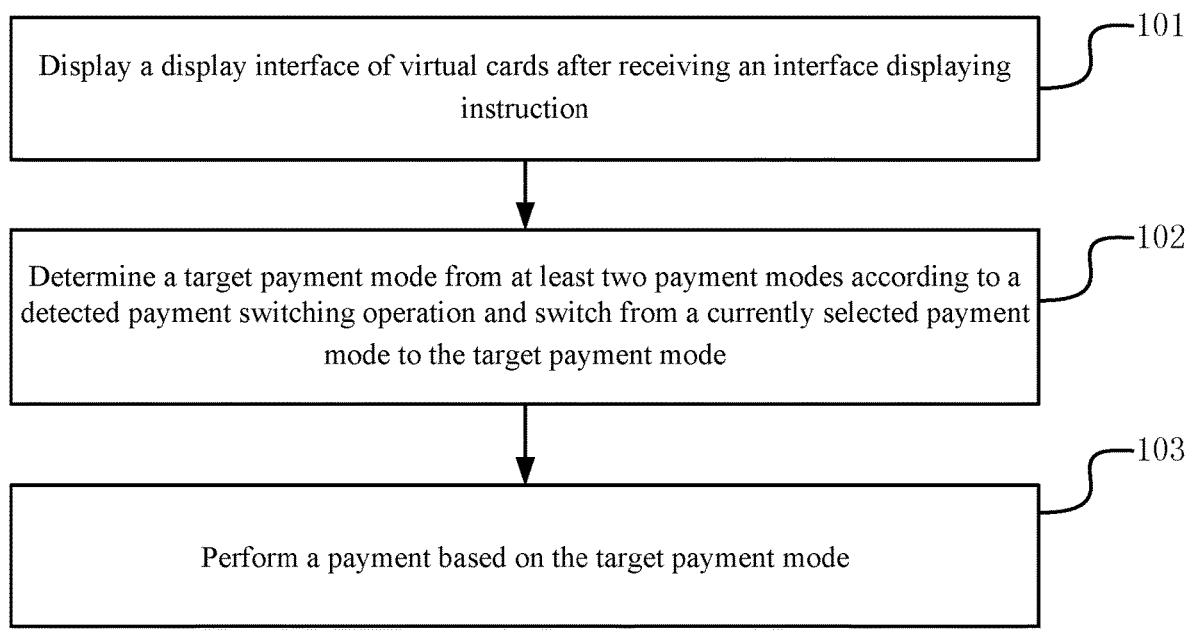
FIG. 1 is a flowchart showing a payment switching method according to an exemplary embodiment.

FIG. 1 is a flowchart showing a payment switching method according to an exemplary embodiment. The payment switching method shown in FIG. 1 is applied in or implemented by a first terminal, and includes steps 101-103.

In step 101, a display interface of virtual cards is displayed after receiving an interface displaying instruction. The display interface of the virtual cards displays at least two payment modes, one of the at least two payment modes being a currently selected payment mode.

The payment modes include at least the above-described first payment mode and second payment mode.

In step 102, a target payment mode is determined from the at least two payment modes according to a detected payment switching operation and the currently selected payment mode is switched to the target payment mode.

In step 103, a payment is performed based on the target payment mode.

In some embodiments, the interface displaying instruction is triggered after a designated operation on a hardware component of the first terminal is detected under a state that a screen of the first terminal is locked.

In some embodiments, the interface displaying instruction is triggered after a device of a designated type is detected by an NFC module of the first terminal within a preset distance.

In some embodiments, the interface displaying instruction is triggered after an operation on a shortcut icon is detected. The shortcut icon is configured to trigger or activate the display interface of the virtual cards.

In some embodiments, the designated operation on the hardware component of the first terminal includes at least one of a clicking operation, consecutive clicking operations, or a long pressing operation on a preset physical button of the first terminal. In some embodiments, the designated operation includes a preset operation on the screen of the first terminal. In some embodiments, the designated operation includes a preset operation on a fingerprint identifying module of the first terminal.

In some embodiments, the display interface of the virtual cards displays a first list of the virtual cards supporting the first payment mode when the first payment mode is selected. The first list of the virtual cards represents bank cards supporting the first payment mode.

In some embodiments, the display interface of the virtual cards displays a second list of the virtual cards supporting the second payment mode when the second payment mode is selected. The second list of the virtual cards represents account information supporting the second payment mode.

In some embodiments, the payment switching operation is a swiping operation towards right or left on the display interface of the virtual cards. In some embodiments, the payment switching operation is a triggering operation on any one of first and second lists of the virtual cards displayed in the display interface.

In some embodiments, when the target payment mode is the second payment mode, performing the payment based on the target payment mode includes displaying a payment graphic logo after receiving a first payment instruction to enable a second terminal to scan the payment graphic logo. In some embodiments, performing the payment includes scanning the payment graphic logo by the second terminal to complete the payment. The payment graphic logo is configured to indicate account information supporting the second payment mode. Alternatively or additionally, in some embodiments, performing the payment includes scanning a receiving graphic logo and acquiring receiving account information to complete the payment according to the account information supporting the second payment mode and the receiving account information. Alternatively or additionally, in some embodiments, performing the payment includes reading payment account information from a designated storage region or medium after receiving a second payment instruction, and sending the payment account information to the second terminal by an NFC module of the first terminal to complete the payment. The payment account information is generated by a server according to the account information supporting the second payment mode.

In some embodiments, the method shown in FIG. 1 further includes generating at least two lists of the virtual cards corresponding to the at least two payment modes, respectively. In some embodiments, performing the payment based on the target payment mode includes displaying a list of the virtual cards supporting the target payment mode and performing the payment according to the list.

The above alternative technical solutions may be combined in any manner to form alternative embodiments of the present disclosure, which are not elaborated herein.

Figure 2:
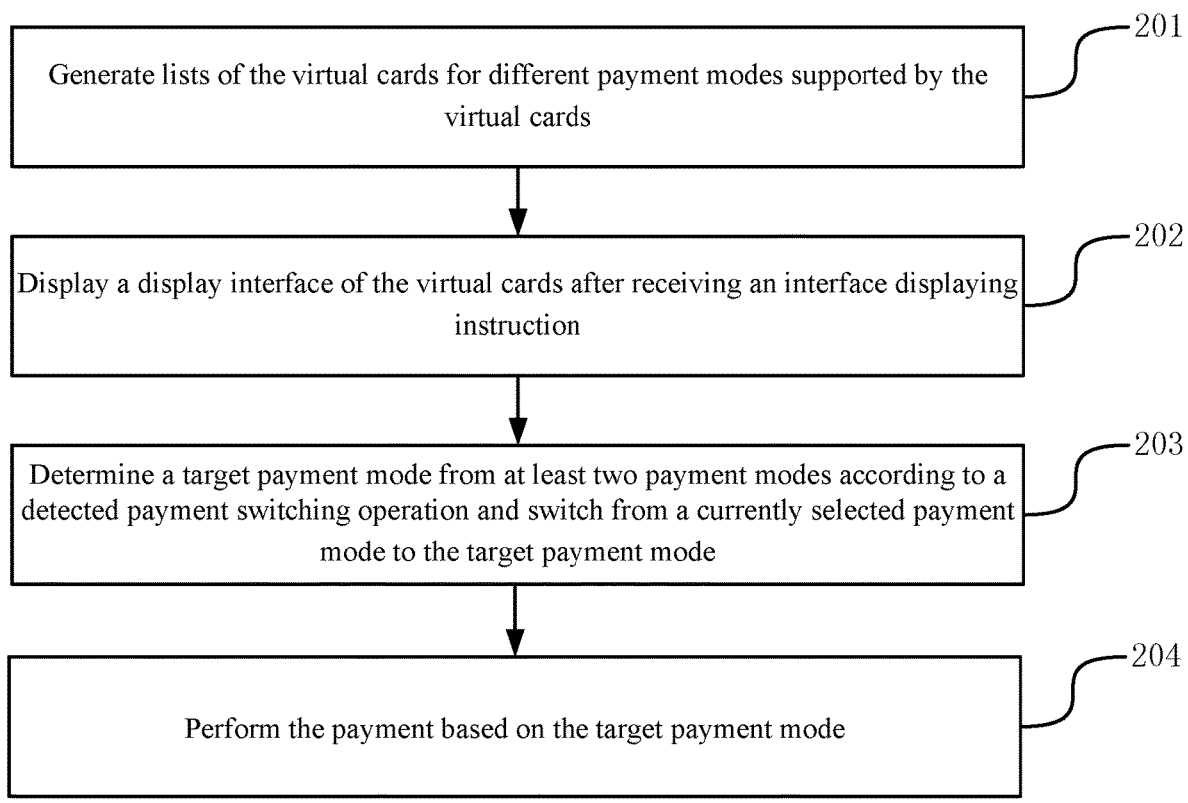
FIG. 2 is a flowchart showing a payment switching method according to another exemplary embodiment.

FIG. 2 is a flowchart showing a payment switching method according to an exemplary embodiment. The method shown in FIG. 2 is applied in or implemented by a terminal, such as the first terminal (or a paying terminal). The method includes steps 201-204.

In step 201, lists of the virtual cards are generated for different payment modes supported by the virtual cards.

In some embodiments, a unique account is associated with the first terminal. The account may be an account of a payment application. There may be a plurality of virtual cards associated with an account. In order to directly exhibit differences among the payment modes supported by the virtual cards when displaying the virtual cards, a list of the virtual cards is generated corresponding to each payment mode respectively. The contents represented by the virtual cards in the lists may be different for different payment modes. For example, each virtual card in the first list supporting the first payment mode may represent a virtual bank card that supports the first payment mode, and each virtual card in the second list supporting the second payment mode may represent account information that supports the second payment mode.

In order to highlight the selected payment mode, the list of the virtual cards corresponding to the selected payment mode may be displayed in the display interface of the virtual cards.

In some embodiments, the display interface of the virtual cards displays the first list of the virtual cards supporting the first payment mode when the first payment mode is selected. Each virtual card in the first list represents a virtual bank card that supports the first payment mode. In some embodiments, the display interface of the virtual cards displays the second list of the virtual cards supporting the second payment mode when the second payment mode is selected. Each virtual card in the second list represents the account information that supports the second payment mode.

In order to further highlight the selected payment mode, an option corresponding to the selected payment mode may be displayed in a selected state, which may be highlighted. In some embodiments, the selected state may be different from an unselected state. For example, display brightness of the option in the selected state may be higher than display brightness of the option in the unselected state.

Figure 3:
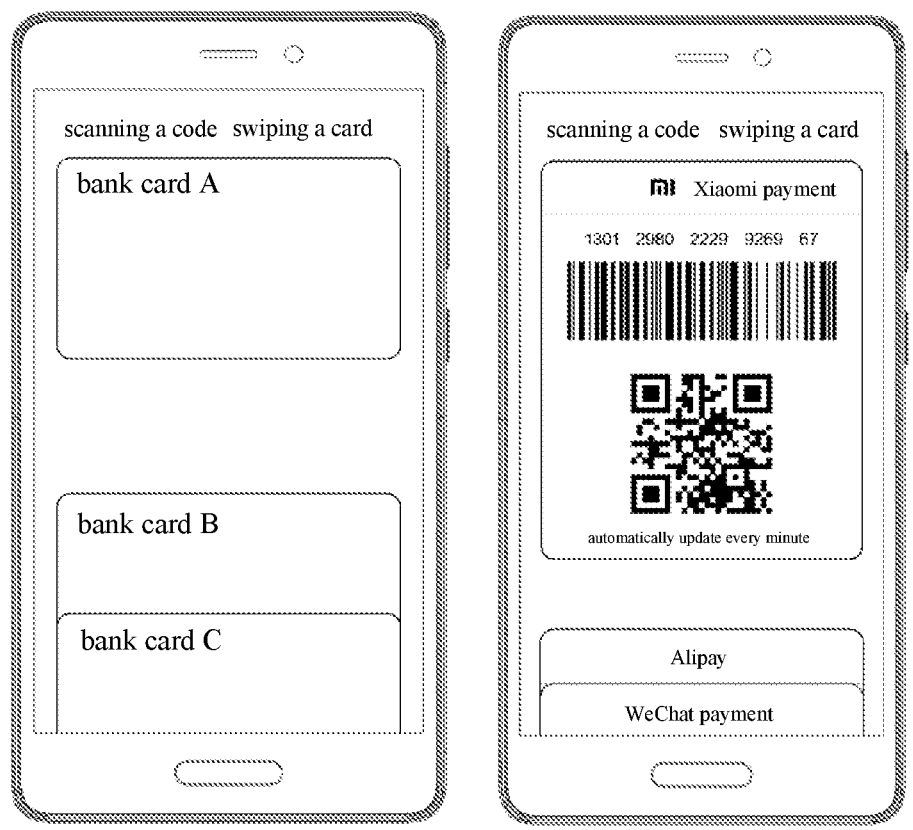
FIG. 3 is a schematic diagram illustrating a display interface of virtual cards according to an exemplary embodiment.

FIG. 3 is a schematic diagram illustrating a display interface of virtual cards. In FIG. 3, options labeled "swiping a card" and "scanning a code" are included. The options correspond to two lists of virtual cards, respectively. The virtual cards corresponding to "swiping a card" support the flash payment based on NFC and the virtual cards corresponding to "scanning a code" represent the account information that supports the third-party payment mode. When the first payment mode (e.g., flash payment based on NFC) is selected, the list of virtual cards is shown in the left display interface in FIG. 3.

In any one of the lists of the virtual cards, a first virtual card or a first account added by a user is determined to be a default card or a default account of the payment mode. In some embodiments, the default card or the default account may be reset according to a subsequently adjustment.

Referring back to FIG. 2, in step 202, a display interface of the virtual cards is displayed after receiving an interface displaying instruction.

Triggering modes for triggering the interface displaying instruction include one of followings.

In a first triggering mode, the interface displaying instruction is triggered after detecting a designated operation on a hardware component of the first terminal under a state that a screen of the first terminal is locked.

The designated operation on the hardware component of the first terminal includes at least one of followings: a clicking operation, consecutive clicking operations, or a long pressing operation on a preset physical button of the first terminal, in which the preset physical button may be a physical button. For example, the designated operation may be double clicks or a long press on a home physical button. The preset physical button may also be one or more of a plurality of physical buttons. For example, the designated operation may be simultaneously clicking on both of a power button and the home button twice. In some embodiments, a preset operation on the screen of the first terminal includes, for example, consecutive clicking operations, a swiping operation, and the like. In some embodiments, a preset operation on a fingerprint identifying module of the first terminal includes, for example, double clicks on the fingerprint identifying module and the like.

In some embodiments, the user of the first terminal sets a designated operation for triggering or activating the display interface of the virtual cards in the first terminal in advance such that the first terminal better fits habits of the user.

With the first triggering mode for triggering the display interface, a method of rapidly switching the payment modes is provided to the user, thereby significantly shortening an operating path and enhancing terminal performance.

In addition, with the first triggering mode for triggering the display interface, the display interface of the virtual cards is triggered or activated directly by operating on the hardware component of the first terminal. Therefore, a quick access employed by the first triggering mode is directly connected with the hardware component of the first terminal. To enhance the safety and security of the hardware component against potential illegitimate manipulations, the payment application may be a native application installed in the first terminal, or an application certified by a manufacturer of the first terminal. Then, even if the payment application has controlling privileges over the hardware component, the safety and security of the hardware component are ensured while convenience and efficiency are improved.

In a second triggering mode, the interface displaying instruction is triggered after a device of a designated type is detected by an NFC module of the first terminal within a preset distance.

The device of the designated type is a receiving terminal, such as a POS machine, a code scanner, or the like.

The first terminal (e.g., paying terminal) detects whether there is a device of the designated type within the preset distance via the NFC module provided in the first terminal. The detection is performed by detecting whether the first terminal enters into a radio-frequency field of a device of the designated type, or by detecting whether there is a device of the designated type entering into the radio-frequency field of the first terminal. The present disclosure does not specifically limit the detection methods.

In some embodiments, when detecting whether the first terminal enters into the radio-frequency field of a device of the designated type, the device of the designated type is a primary device in an NFC communication and is configured to transmit or broadcast a searching signal to its surroundings. The first terminal receives the searching signal, and thereby receiving the device information carried by the searching signal. The first terminal determines, based on the device information, whether the device is a device of the designated type. The interface displaying instruction is triggered after the first terminal determines that the device is a device of the designated type. The device information may be model information of the device, type information of the device, or the like.

In some embodiments, when detecting whether there is a device of the designated type entering into the radio-frequency field of the first terminal, the first terminal is a primary device in an NFC communication configured to transmit or broadcast a searching signal to its surroundings. Any device may feedback a response signal to the first terminal after receiving the searching signal. The first terminal determines whether the device is a device of the designated type according to device information carried by the response signal. The interface displaying instruction is triggered after it is determined the device is the device of the designated type. The device information may be model information of the device, type information of the device, or the like.

The descriptions of the above embodiments are exemplary and are not intended to be construed to limit the present disclosure. Furthermore, in some embodiments, it is also determined whether there is a device of the designated type within the preset distance by detecting whether the NFC module receives a receiving instruction or a paying instruction, which is not limited in the present disclosure.

In some embodiments, the interface displaying instruction is triggered by other operations on the first terminal input by a user. For example, a shortcut icon may be displayed on an interface of the first terminal. The shortcut icon is configured to trigger or activate the display interface of the virtual cards. The interface displaying instruction is triggered after detecting a triggering operation (such as a clicking operation) on the shortcut icon. Then, the display interface of the virtual cards is displayed in response to the interface displaying instruction. In this manner, the operation path is shortened significantly and switching convenience and efficiency are improved.

In step 203, a target payment mode is determined from the at least two payment modes according to a detected payment switching operation and a currently selected payment mode is switched to the target payment mode.

The switching operation may be a swiping operation, e.g., towards right or left, on the display interface of the virtual cards. For example, taking the interface shown on the left side in FIG. 3 as an example, the list of "swiping a card" may be switched to the list of "scanning a code" (shown in the interface on the right side in FIG. 3) after detecting a swiping operation towards the left on the display interface of the virtual cards. Through the switching operation, the payment mode is switched from a currently selected payment mode (e.g., flash payment based on NFC) to the third-party payment mode corresponding to the list of "scanning a code."

The switching operation may be a triggering operation on any one of the lists of the virtual cards displayed in the display interface. The triggering operation may be a clicking operation on an option corresponding to a list of the virtual cards. For example, the list of the virtual cards corresponding to the option may be displayed after detecting the clicking operation on the option "swiping a card."

FIG. 3 is an example of the switching operation. When the third-party payment mode is the currently selected payment mode, through the switching operation, the target payment mode is switched to a flash payment mode based on NFC (e.g., using the listed virtual bank cards).

In each payment mode, the default card or the default account is set. For example, through a card switching operation, the default card may be switched from a virtual Bank Card A to a virtual Bank Card B. Alternatively or additionally, through an account switching operation, the default account may be switched from a first account (e.g., a bank account associated with Bank Card A or an account associated with a third-party payment mode) to a second account (e.g., a bank account associated with Bank Card B or an account associated with a third-party payment mode). In some embodiments, for the third-party payment mode, a plurality of third-party payment modes (such as Alipay, Xiaomi payment, WeChat payment, and the like) may be bound to a terminal.

In step 204, the payment is performed based on the target payment mode.

Step 204 may include: displaying the list of the virtual cards supporting the target payment mode and performing the payment based on the list of the virtual cards supporting the target payment mode. The user may select any virtual card from the displayed list of the virtual cards supporting the target payment mode and perform the payment based on the selected virtual card.

For the first payment mode, the receiving terminal performs an interaction with a backend server to complete the payment. Operations based on the target payment mode include scanning codes actively, scanning codes passively, and induction payment based on NFC when the target payment mode is the second payment mode. Detailed implementations of various types of operations are described below.

In a first implementation method, a payment graphic logo is displayed after a first payment instruction is received. The payment graphic logo is scanned by a second terminal to complete the payment. The payment graphic logo is configured to indicate account information supporting the second payment mode.

The first payment instruction is configured to instruct that the payment is to be performed through the displayed payment graphic logo.

In some embodiments, the first implementation method includes an operation of displaying the payment graphic logo by the paying terminal. The payment graphic logo is then scanned by the receiving terminal to acquire the account information from the paying terminal, such that the receiving terminal can perform an interaction with a third-party payment platform to complete the payment from the paying terminal to the receiving terminal using the account information received from the paying terminal.

In some embodiments, the paying terminal performs the payment using a bank card bound with the third-party payment mode or using an account balance. A server encrypts the account information and the payment mode to generate a cluster of payment graphic logos that represent account information of the user of the paying terminal. The cluster of payment graphic logos are generated in advance and stored as a list of the payment graphic logos. The server sends the list of the payment graphic logos to the paying terminal. The paying terminal reads a payment graphic logo from the list of the payment graphic logos in a random manner every time when the paying terminal performs a payment. To enhance security, a payment password may be set such that the paying terminal performs the payment with the password after the payment graphic logo is scanned. In order to simplify the payment process, the payment may be directly performed without the password when the payment amount is relatively small.

In a second implementation method, a receiving graphic logo is scanned and receiving account information is acquired to complete the payment according to account information supporting the second payment mode and the receiving account information.

In some embodiments, the second implementation method includes an operation of scanning, by the paying terminal, the receiving graphic logo provided by the receiving terminal to acquire account information from the receiving terminal, such that the paying terminal performs an interaction with the third-party payment platform to complete the payment from the paying terminal to the receiving terminal using the account information from the receiving terminal. In some embodiments, the amount being paid may be carried in the receiving graphic logo or be input manually by a user.

In a third implementation method, after a second payment instruction is received, the payment account information is read from a designated storage region or medium and the payment account information is sent to the receiving terminal by an NFC module of the paying terminal to complete the payment. The payment account information is generated by a server according to account information supporting the second payment mode.

The second payment instruction is configured to instruct that the payment is to be performed via the NFC module. In some embodiments, the third implementation method includes an operation of sending, by the paying terminal, encrypted account information to the receiving terminal via the NFC module. The receiving terminal decrypts the account information to acquire the account information associated with the paying terminal, such that the receiving terminal performs an interaction with the third-party payment platform to complete the payment from the paying terminal to the receiving terminal using the account information of the paying terminal. This payment process may be seen as an induction payment process by the NFC module.

In some embodiments, the server encrypts the account information of the user of the terminal and the payment mode to generate a cluster of pieces of payment account information that represents the account information of the user of the terminal. For each piece of account information of the user of the terminal, a plurality of pieces of payment account information may be generated in advance. The plurality of pieces of payment account information are stored as a list of payment account information. The list of payment account information is sent by the server to the terminal such that the terminal may acquire a piece of the payment account information in a random manner from the list of the payment account information every time when performing a payment. The induction payment process is similar to the process of graphic logo scanning, except that the medium for data transmission is different. In some embodiments, when the terminal has added a plurality of pieces of account information, generating and sending the list of payment account information may be performed for each of the plurality of pieces of account information.

The graphic logo may be a two-dimensional code, a bar code, or other graphic logo representing corresponding information, which is not limited in the present disclosure.

In some embodiments, the first list of the virtual cards corresponding to the first payment mode (such as a list of bank cards based on NFC flash payment) may be displayed as a default list when the display interface of virtual cards is triggered or activated a first time. If a user switches the payment mode to the second payment mode and completes a payment, the second list of the virtual cards corresponding to the second payment mode may be displayed as a default list when the display interface of virtual cards is triggered or activated again.

In the disclosed embodiments, by providing the display interface of the virtual cards, an access for rapidly switching the payment modes is provided to a user, thereby significantly shortening the operating path.

In addition, because the display interface of the virtual cards may be triggered or activated by directly operating on the hardware component of the first terminal, a quick access employed by the interface triggering or activating mode described above is directly connected with the hardware component of the first terminal. To enhance security and safety of the hardware component against potential illegitimate manipulations, the payment application may be a native application in the first terminal, or an application certified by a manufacturer of the first terminal. In this manner, even if the payment application has controlling privileges over the hardware component, the safety and security of the hardware component are ensured while convenience and efficiency are improved.

Figure 4:
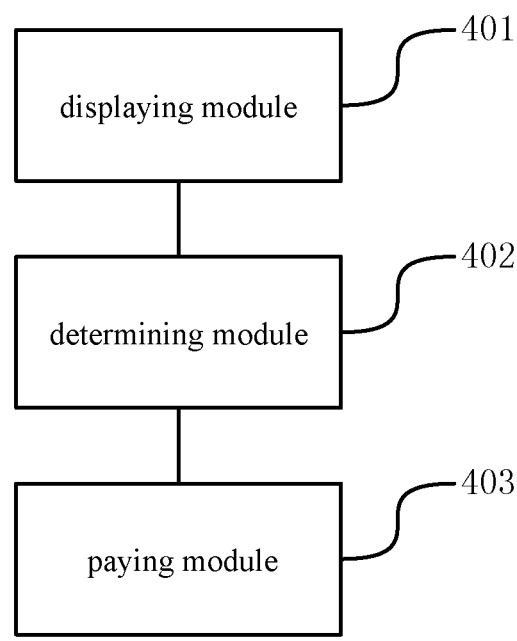
FIG. 4 is a block diagram of a payment switching device according to an exemplary embodiment.

FIG. 4 is a block diagram of a payment switching device 400 according to an exemplary embodiment. The payment switching device 400 may be an embodiment of the disclosed terminal (e.g., a paying terminal or a receiving terminal, a first or second terminal). Referring to FIG. 4, the device 400 includes: a displaying module 401, a determining module 402, and a paying module 403.

The displaying module 401 is configured to display a display interface of virtual cards after receiving an interface displaying instruction. The display interface of the virtual cards displays at least two payment modes.

The determining module 402 is configured to determine a target payment mode from the at least two payment modes according to a detected payment switching operation.

The paying module 403 is configured to perform a payment based on the target payment mode.

In some embodiments, the device 400 further includes a first triggering module configured to trigger an interface displaying instruction after detecting a designated operation on a hardware component of the device 400 under a state that a screen of the device 400 is locked.

In some embodiments, the device 400 further includes a second triggering module configured to trigger the interface displaying instruction after detecting a device of a designated type by an NFC module within a preset distance.

In some embodiments, the device 400 further includes a third triggering module configured to trigger the interface displaying instruction after detecting an operation on a shortcut icon. The shortcut icon is configured to trigger or activate the display interface of the virtual cards.

In some embodiments, the designated operation on the hardware component of the device 400 includes one of: a clicking operation, consecutive clicking operations, or a long pressing operation on a preset physical button of the device 400. In some embodiments, the designated operation includes a preset operation on the screen of the device 400, or a preset operation on a fingerprint identifying module of the device 400.

In some embodiments, the display interface of the virtual cards displays a first list of the virtual cards supporting a first payment mode when the first payment mode is selected. The first list of the virtual cards represents bank cards supporting the first payment mode.

In some embodiments, the display interface of the virtual cards displays a second list of the virtual cards supporting a second payment mode when the second payment mode is selected. The second list of the virtual cards represents account information supporting the second payment mode.

In some embodiments, the payment switching operation is a swiping operation, e.g., towards right or left, on the display interface of the virtual cards. In some embodiments, the payment switching operation is a triggering operation on any one of the lists of virtual cards displayed in the display interface.

In some embodiments, the paying module 403 is configured to cause a payment graphic logo to be displayed by the displaying module 401 after receiving a first payment instruction. In some embodiments, the paying module 403 is configured to scan a payment graphic logo to complete a payment. The payment graphic logo is configured to indicate account information supporting the second payment mode. In some embodiments, the paying module 403 is configured to scan a receiving graphic logo and acquire receiving account information to complete the payment according to account information supporting the second payment mode and the receiving account information. In some embodiments, the paying module 403 is configured to read payment account information from a designated storage region or medium after receiving a second payment instruction and send the payment account information to a terminal (e.g., a device similar to device 400) by an NFC module of the device 400 to complete the payment. In some embodiments, the payment account information is generated by a server according to account information supporting the second payment mode.

In some embodiments, the device 400 further includes a list generating module configured to generate lists of the virtual cards corresponding to the at least two payment modes, respectively. The displaying module 401 is further configured to display a list of the virtual cards supporting the target payment mode. The paying module 403 is configured to perform the payment according to the displayed list.

With respect to the disclosed devices, the specific manners for performing operations have been described in detail in the descriptions of the embodiments of the disclosed methods and, therefore, are not repeated.

The above describes an exemplary division of functionalities of the payment switching device 400 in a payment mode switching operation. In some embodiments, these functionalities may be performed by different modules as needed. For example, an internal structure of the device 400 may be divided into different functionality modules to complete all or parts of the functionalities described above. Furthermore, the disclosed payment switching device shares the same principles with the disclosed payment switching methods. Accordingly, the specific operations performed by the device 400 may correspond to the descriptions of the disclosed methods.

Figure 5:
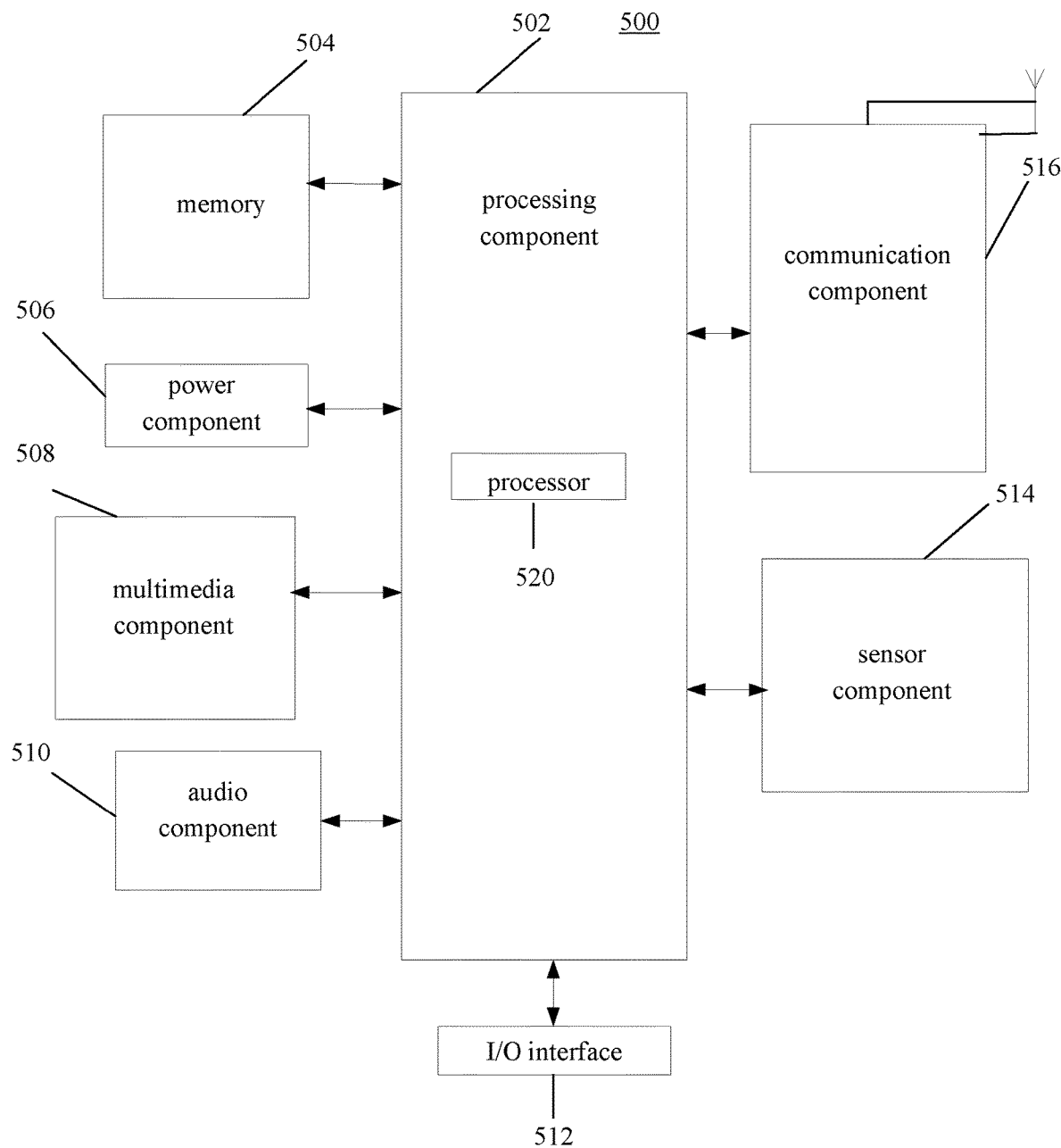
FIG. 5 is a block diagram of a device for switching a payment mode according to an exemplary embodiment.

FIG. 5 is a block diagram of a device 500 for switching a payment mode according to an exemplary embodiment. For example, the device 500 may be a mobile phone, a computer, a digital broadcasting terminal, a messaging device, a game console, a tablet device, a medical device, fitness equipment, a Personal Digital Assistant PDA, and the like. The device 500 may be an embodiment of the device 400, or vice versa. In some embodiments, the device 500 may include the device 400, or vice versa. In some embodiments, the device 500 may be an embodiment of the disclosed terminals (e.g., paying or receiving terminals, first or second terminals, etc.).

Referring to FIG. 5, the device 500 includes one or more of the following components: a processing component 502, a memory 504, a power component 506, a multimedia component 508, an audio component 510, an Input/Output (I/O) interface 512, a sensor component 514, and a communication component 516.

The processing component 502 is configured to control overall operations of the device 500, such as the operations associated with display, telephone calls, and data communications, camera operations, and recording operations. The processing component 502 includes one or more processors 520 configured to execute instructions to perform all or part of the disclosed methods. In some embodiments, the processing component 502 includes one or more modules configured to facilitate the interaction between the processing component 502 and other components. For example, in some embodiments, the processing component 502 includes a multimedia module configured to facilitate the interaction between the multimedia component 508 and the processing component 502.

The memory 504 is configured to store various types of data to support the operation of the device 500. Examples of such data include instructions for any applications or methods implemented by the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

The power component 506 is configured to provide power to various components of the device 500. The power component 506 includes a power management system, one or more power sources, and any other components associated with the generation, management, and distribution of power in the device 500.

The multimedia component 508 includes a screen providing an output interface between the device 500 and a user of the device 500. In some embodiments, the screen may include a liquid crystal display and a press panel. If the screen includes the press panel, the screen may be implemented as a press screen to receive input signals from the user. The press panel includes one or more press sensors configured to sense presses, swipes, and other gestures on the press panel. The press sensors sense not only a boundary of a press or swipe action, but also a duration time and a pressure associated with the press or swipe action. In some embodiments, the multimedia component 508 includes a front camera and/or a rear camera. The front camera and/or the rear camera are configured to receive external multimedia data while the device 500 is in an operation mode, such as a photographing mode or a video mode. Each of the front camera and the rear camera has a fixed optical lens system or a focus and optical zoom capability.

The audio component 510 is configured to output and/or input audio signals. For example, the audio component 510 includes a microphone configured to receive an external audio signal when the device 500 is in an operation mode, such as a call mode, a recording mode, and a voice recognition mode. The received audio signal may be stored in the memory 504 or transmitted via the communication component 516. In some embodiments, the audio component 510 further includes a speaker configured to output audio signals.

The I/O interface 512 is configured to provide an interface for the processing component 502 and peripheral interface modules, such as a keyboard, a click wheel, buttons, and the like. The buttons include, but are not limited to, a home button, a volume button, a starting button, and a locking button.

The sensor component 514 includes one or more sensors configured to provide status assessments of various aspects of the device 500. For example, in some embodiments, the sensor component 514 detects an open/closed status of the device 500 and relative positioning of components (e.g. a display and a keypad of the device 500). In some embodiments, the sensor component 514 detects a change in position of the device 500 or a component in the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 also includes an accelerometer sensor, a gyroscope sensor, a magnetic sensor, a pressure sensor, or a temperature sensor.

The communication component 516 is configured to facilitate wired or wireless communication between the device 500 and other devices. The device 500 can access a wireless network based on a communication standard, such as WiFi, 2G, 3G, 4G; or a combination thereof. In some embodiments, the communication component 516 receives a broadcast signal or broadcast associated information from an external broadcast management system via a broadcast channel. In some embodiments, the communication component 516 includes a near field communication (NFC) module configured to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the disclosed methods.

In some embodiments, the present disclosure also provides a non-transitory computer-readable storage medium including instructions, such as the memory 504 including instructions. The instructions are executable by the processor 520 of the device 500, for performing the disclosed methods. For example, the non-transitory computer-readable storage medium may be a ROM, a RAM, a CD-ROM, a magnetic tape, a floppy disc, an optical data storage device, and the like.

In some embodiments, the present disclosure provides a non-transitory computer-readable storage medium. A mobile terminal (e.g., device 500 or 400) performs the disclosed payment switching methods, such as those shown in FIG. 1 and FIG. 2, when the instructions in the storage medium are executed by a processor of the mobile terminal.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It is to be understood that the present disclosure is not limited to the exact construction that has been described above and illustrated in the accompanying drawings, and that various modifications and changes can be made without departing form the scope thereof. It is intended that the scope of the disclosure only be limited by the appended claims.

What is claimed is:

1. A payment switching method performed by a first terminal, comprising:
generating a first list of virtual cards corresponding to a first payment mode and a second list of virtual cards corresponding to a second payment mode, wherein each virtual card in the first list supporting the first payment mode represents a virtual bank card that supports the first payment mode, each virtual card in the second list supporting the second payment mode represents account information that supports the second payment mode, the first payment mode is a flash payment based on near field communication (NFC), and the second payment mode is a third-party payment mode based on quick response (QR) code;
triggering an interface displaying instruction after detecting a designated operation on a hardware component of the first terminal under a state that a screen of the first terminal is locked;
displaying, on the screen of the first terminal, a display interface of virtual cards after receiving the interface displaying instruction by the first terminal, wherein the display interface displays the first list and the second list, wherein one of the first list and the second list, that supports a currently selected payment mode, is highlighted in a selected state, and the virtual cards in the one of the first list and the second list are displayed;
detecting a payment switching operation on the display interface;
determining a target payment mode from the first payment mode and the second payment mode according to the detected payment switching operation and switching from the currently selected payment mode to the target payment mode;
displaying the display interface of virtual cards, wherein the display interface displays the first list and the second list, wherein the other one of the first list and the second list, that corresponds to the target payment mode, is highlighted in the selected state, and the virtual cards in the other one of the first list and the second list are displayed; and
performing a payment based on the list of virtual cards supporting the target payment mode.

2. The method according to claim 1, wherein a designated operation on the hardware component of the first terminal includes at least one of:
a clicking operation, consecutive clicking operations, or a long pressing operation on a preset physical button of the first terminal;
a preset operation on the screen of the first terminal; or
a preset operation on a fingerprint identifying module of the first terminal.

3. The method according to claim 1, wherein the payment switching operation is a left or right swiping operation on the display interface of the virtual cards; or
the payment switching operation is a triggering operation on one of the first and second lists of the virtual cards on the display interface.

4. The method according to claim 1, wherein when the target payment mode is the second payment mode, performing the payment based on the target payment mode includes:
displaying a payment graphic logo after receiving a first payment instruction; and
scanning the payment graphic logo by a second terminal to complete the payment, wherein the payment graphic logo is configured to indicate account information supporting the second payment mode; or
scanning a receiving graphic logo and acquiring receiving account information to complete the payment according to the account information supporting the second payment mode and the receiving account information; or
reading payment account information from a designated storage region after receiving a second payment instruction and sending the payment account information to the second terminal by an NFC module of the first terminal to complete the payment, wherein the payment account information is generated by a server according to the account information supporting the second payment mode.

5. A device for switching a payment mode, comprising:
a processor; and
a memory configured to store instructions to be executed by the processor;
wherein the processor is configured to, when executing the instructions stored in the memory:
generate a first list of virtual cards corresponding to a first payment mode and a second list of virtual cards corresponding to a second payment mode, wherein each virtual card in the first list supporting the first payment mode represents a virtual bank card that supports the first payment mode, each virtual card in the second list supporting the second payment mode represents account information that supports the second payment mode, the first payment mode is a flash payment based on near field communication (NFC), and the second payment mode is a third-party payment mode based on quick response (QR) code;

trigger an interface displaying instruction after detecting a designated operation on a hardware component of the first terminal under a state that a screen of the first terminal is locked;

display a display interface of virtual cards after receiving the interface displaying instruction, wherein the display interface displays the first list and the second list, wherein one of the first list and the second list, that supports a currently selected payment mode, is highlighted in a selected state, and the virtual cards in the one of the first list and the second list are displayed;

detect a payment switching operation on the display interface;

determine a target payment mode from the first payment mode and the second payment mode according to the detected payment switching operation and switch from the currently selected payment mode to the target payment mode;

display the display interface of virtual cards, wherein the display interface displays the first list and the second list, wherein the other one of the first list and the second list, that corresponds to the target payment mode, is highlighted in the selected state, and the virtual cards in the other one of the first list and the second list are displayed; and perform a payment based on the list of virtual cards supporting the target payment mode.

6. The device according to claim 5, wherein the designated operation on the hardware component includes at least one of:

a clicking operation, consecutive clicking operations, or a long pressing operation on a preset physical button of the device;

a preset operation on the screen of the device; or a preset operation on a fingerprint identifying module of the device.

7. The device according to claim 5, wherein when the target payment mode is the second payment mode, the processor is configured to perform the payment based on the target payment mode by acts of:

displaying a payment graphic logo after receiving a first payment instruction to enable a second terminal to scan the payment graphic logo to complete the payment, wherein the payment graphic logo is configured to indicate account information supporting the second payment mode; and scanning a receiving graphic logo and acquiring receiving account information to complete the payment according to the account information supporting the second payment mode and the receiving account information; or reading payment account information from a designated storage region after receiving a second payment instruction and sending the payment account information to the second terminal by an NFC module of the first terminal to complete the payment, wherein the payment account information is generated by a server according to the account information supporting the second payment mode.

8. A non-transitory computer-readable storage medium having instructions stored therein that, when executed by a processor of a device, cause the device to perform a payment switching method, the method comprising:

generating a first list of virtual cards corresponding to a first payment mode and a second list of virtual cards corresponding to a second payment mode, wherein each virtual card in the first list supporting the first payment mode represents a virtual bank card that supports the first payment mode, each virtual card in the second list supporting the second payment mode represents account information that supports the second payment mode, the first payment mode is a flash payment based on near field communication (NFC), and the second payment mode is a third-party payment mode based on quick response (QR) code;

triggering an interface displaying instruction after detecting a designated operation on a hardware component of the first terminal under a state that a screen of the first terminal is locked;

displaying a display interface of virtual cards after receiving the interface displaying instruction by the first terminal, wherein the display interface displays the first list and the second list, wherein one of the first list and the second list, that supports a currently selected payment mode, is highlighted in a selected state, and the virtual cards in the one of the first list and the second list are displayed;

detecting a payment switching operation on the display interface;

determining a target payment mode from the first payment mode and the second payment mode according to the detected payment switching operation and switching from the currently selected payment mode to the target payment mode;

displaying the display interface of virtual cards, wherein the display interface displays the first list and the second list, wherein the other one of the first list and the second list, that corresponds to the target payment mode, is highlighted in the selected state, and the virtual cards in the other one of the first list and the second list are displayed; and performing a payment based on the list of virtual cards supporting the target payment mode.

* * * * *